(12) United States Patent  
Barr et al.

(10) Patent No.: US 9,288,234 B2
(45) Date of Patent: Mar. 15, 2016

(54) SECURITY POLICY ENFORCEMENT

(75) Inventors: Arthur J. Barr, Basingstoke (GB);
Oliver M. Deakin, Southampton (GB);
Robert B. Nicholson, Southsea (GB);
Colin J. Thorne, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/235,829

(22) PCT Filed: Jul. 31, 2012

(86) PCT No.: PCT/IB2012/053897
§ 371 (c)(1),
(2), (4) Date: Jan. 29, 2014

(87) PCT Pub. No.: WO2013/018025
PCT Pub. Date: Feb. 7, 2013

(65) Prior Publication Data
US 2014/0196108 A1    Jul. 10, 2014

(30) Foreign Application Priority Data
Aug. 4, 2011 (EP) .................................... 11176580

(51) Int. Cl.
*H04L 29/06* (2006.01)
(52) U.S. Cl.
CPC .............. *H04L 63/20* (2013.01); *H04L 63/205* (2013.01); *H04L 63/0823* (2013.01); *H04L 63/10* (2013.01)
(58) Field of Classification Search
None
See application file for complete search history.

(56) References Cited

U.S. PATENT DOCUMENTS

| 7,827,404 | B1 | 11/2010 | Freed et al. |
| 7,979,694 | B2 | 7/2011 | Touitou et al. |

(Continued)

FOREIGN PATENT DOCUMENTS

| CN | 1790982 | 6/2006 |
| CN | 1954545 A | 4/2007 |

(Continued)

OTHER PUBLICATIONS

International Searching Authority, International Search Report and Written Opinion for International Application No. PCT/IB2012/053903, Mailed Jan. 17, 2013.

(Continued)

*Primary Examiner* — Hadi Armouche
*Assistant Examiner* — Malcolm Cribbs
(74) *Attorney, Agent, or Firm* — Law Office of Jim Boice

(57) ABSTRACT

A method of operating a network message interceptor for enforcing a security policy for communication over a network between first and second network endpoints, the interceptor being in communication with the network and external to the first and second endpoints, the network including transport layer security, and the security policy identifying at least one valid security standards for communication over the network, the method comprising the steps of: intercepting a handshake message transmitted over the network between the first and second endpoints; extracting from the handshake message an identification of a security standard selected for the communication between the first and second endpoints; determining a validity status of the identified security standard based on the security policy; and preventing communication between the first and second endpoints based on a negatively determined validity status of the identified security standard.

18 Claims, 10 Drawing Sheets

(56) References Cited

U.S. PATENT DOCUMENTS

| | | | |
|---|---|---|---|
| 8,176,542 B2 | 5/2012 | Lawrence et al. | |
| 2005/0268342 A1* | 12/2005 | Shay | G06F 21/57 |
| | | | 726/26 |
| 2007/0016945 A1* | 1/2007 | Bassett | H04L 63/0263 |
| | | | 726/11 |
| 2008/0077790 A1 | 3/2008 | Sato | |
| 2008/0130900 A1 | 6/2008 | Hsieh | |
| 2008/0263215 A1 | 10/2008 | Schnellbaecher | |
| 2010/0088755 A1* | 4/2010 | Gotare | 726/11 |
| 2010/0100930 A1* | 4/2010 | King | H04L 63/1433 |
| | | | 726/1 |
| 2010/0299525 A1 | 11/2010 | Shah et al. | |
| 2010/0318784 A1 | 12/2010 | Rao et al. | |
| 2011/0154026 A1 | 6/2011 | Edstrom et al. | |
| 2011/0154038 A1* | 6/2011 | Qi et al. | 713/170 |
| 2011/0162062 A1* | 6/2011 | Kumar et al. | 726/15 |
| 2011/0208631 A1 | 8/2011 | Glick et al. | |

FOREIGN PATENT DOCUMENTS

| | | | |
|---|---|---|---|
| CN | 101026599 A | * | 8/2007 |
| CN | 101459506 | | 6/2009 |
| EP | 1154610 A2 | | 11/2001 |
| EP | 2173055 A1 | | 4/2010 |

OTHER PUBLICATIONS

T. Dierks et al., "The TLS Protocol: Version 1.0" (RFC 2246), The Internet Society, Jan. 1999, pp. 1-75.

T. Dierks et al., "The Transport Layer Security (TLS) Protocol: Version 1.1" (RFC 4346), The Internet Society, Apr. 2006, pp. 1-82.

T. Dierks et al., "The Transport Layer Security (TLS) Protocol: Version 1.2", (RFC 5246), The Internet Society, Aug. 2008, pp. 1-104.

International Searching Authority, International Search Report and Written Opinion for International Application No. PCT/IB2012/053897, Mailed Dec. 27, 2012.

Anonymous, "Proxy Server", wikipedia.org, Last Updated Jan. 28, 2014, Retrieved Jan. 29, 2014, pp. 1-11.

S. Ruderich, "TLSPROXY (0.2)", ruderich.org, Last Updated Dec. 4, 2013, Retrieved Jan. 29, 2014, pp. 1-2.

Anonymous, "Cisco Systems TLS Proxy Appliation Note", Cisco Systems, Inc., 2008, pp. 1-20.

E. Goh, et al., "SSLV3/TLS Sniffer (Proxy Server): Documentation Page", Stanford University, Retrieved Jan. 29, 2014, pp. 1-3.

U.S. Appl. No. 14/236,280—Non-Final Office Action mailed Feb. 2, 2015.

* cited by examiner

SECURITY POLICY ENFORCEMENT

BACKGROUND

The present invention relates to security policy enforcement. In particular, it relates to enforcing a security policy for communication over a network having transport layer security.

Transport layer security provides communication security for information transmitted between endpoints (i.e., "network endpoints") over a computer network. Transport layer security protocols specify how network endpoints interoperate to create a secure communication path with mechanisms to reduce the prospect of eavesdropping and tampering. An example of transport layer security is defined in protocols such as Secure Sockets Layer (SSL) and the Transport Layer Security (TLS) protocol specified in RFC 2246, RFC 4346 and RFC 5246 (RFC documents published by the Internet Engineering Taskforce (IETF)).

Implementation of a transport layer security protocol is the responsibility of network endpoints, such as software, services and devices communicating over a network. For example, a first software endpoint such as a web browser can initiate communication with a second software endpoint, such as a server. The initiation phase of such communication is undertaken by exchanging messages between the endpoints using a protocol defined "handshake" mechanism. Conventionally, the initiator of such communications is known as the client and the recipient of such initiation messages is known as the server. This convention for describing endpoints as client and server for the purpose of transport layer security does not necessarily reflect the substantive role of, or relationships between, the endpoints in other respects.

During the handshake process, the endpoints select a mutually supported security policy to apply to substantive communications between them. The initiating endpoint (client) indicates which security standards are supported in a handshake message, and the responding endpoint (server) will determine an appropriate, mutually supported, security standard to apply.

The handshake process also includes authentication and authorization steps which are undertaken by one or both endpoints to validate the identity and authority of the other endpoint. Authentication can be undertaken using certificates and authorization using suitable access control mechanisms.

Network service providers rely on individual endpoints to fully and effectively implement transport layer security mechanisms with appropriate and safe security standard selection, authentication and authorization. With these security features implemented by the communication endpoints, network service providers cannot be assured that necessary security policies, such as certificate revocation, expiration and validation policies for authentication, or minimum security standard policies are being adhered to. Further, the requirement for endpoints to undertake authorization functions is a burden on the endpoints, with multiple endpoints undertaking authorization functions resulting in a duplication of functionality across the network.

SUMMARY

The present invention accordingly provides, in a first aspect, a method of operating a network message interceptor for enforcing a security policy for communication over a network between first and second network endpoints, the interceptor being in communication with the network and external to the first and second endpoints, the network including transport layer security, and the security policy identifying at least one valid security standards for communication over the network, the method comprising the steps of: intercepting a handshake message transmitted over the network between the first and second endpoints; extracting from the handshake message an identification of a security standard selected for the communication between the first and second endpoints; determining a validity status of the identified security standard based on the security policy; and preventing communication between the first and second endpoints based on a negatively determined validity status of the identified security standard.

In this way, a network service provider employing an interceptor in accordance with preferred embodiments of the present invention is able to enforce a security policy by examining the security standard selected by endpoints and preventing communication between endpoints where the selected security standard does not conform to the security policy. Other aspects of security standard can be checked and validated against the security policy such as, for example, a policy to prevent the resumption of previous communications sessions between endpoints, which can also be detected by inspection of handshake messages. Accordingly, endpoints are unable to provide substandard, ineffective or insufficient security in respect of communications over a network, and the network service provider can assure conformance with security policy.

The present invention accordingly provides, in a second aspect, a network message interceptor for enforcing a security policy for communication over a network between first and second network endpoints, the network message interceptor being in communication with the network and external to the first and second endpoints, the network including transport layer security, and the security policy identifying at least one valid security standards for communication over the network, the method comprising the steps of: intercepting means for intercepting a handshake message transmitted over the network between the first and second endpoints; extracting means for extracting from the handshake message an identification of a security standard selected for the communication between the first and second endpoints; determining means for determining a validity status of the identified security standard based on the security policy; and preventing means for preventing communication between the first and second endpoints based on a negatively determined validity status of the identified security standard.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the apparatus as described above.

The present invention accordingly provides, in a fourth aspect, a computer program element comprising computer program code to, when loaded into a computer system and executed thereon, cause the computer to perform the steps of a method as described above.

BRIEF DESCRIPTION OF THE SEVERAL VIEWS OF THE DRAWINGS

A preferred embodiment of the present invention is described below in more detail, by way of example only, with reference to the accompanying drawings, in which.

DETAILED DESCRIPTION

Figure 1:
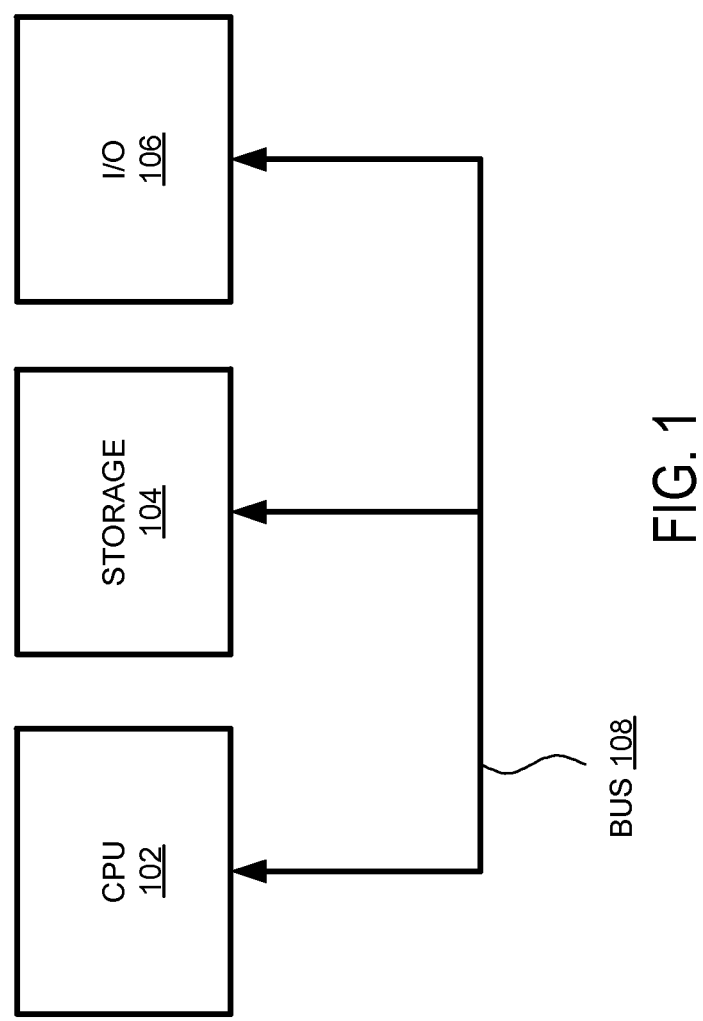
FIG. 1 is a block diagram of a computer system suitable for the operation of embodiments of the present invention.

FIG. 1 is a block diagram of a computer system suitable for the operation of embodiments and components of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
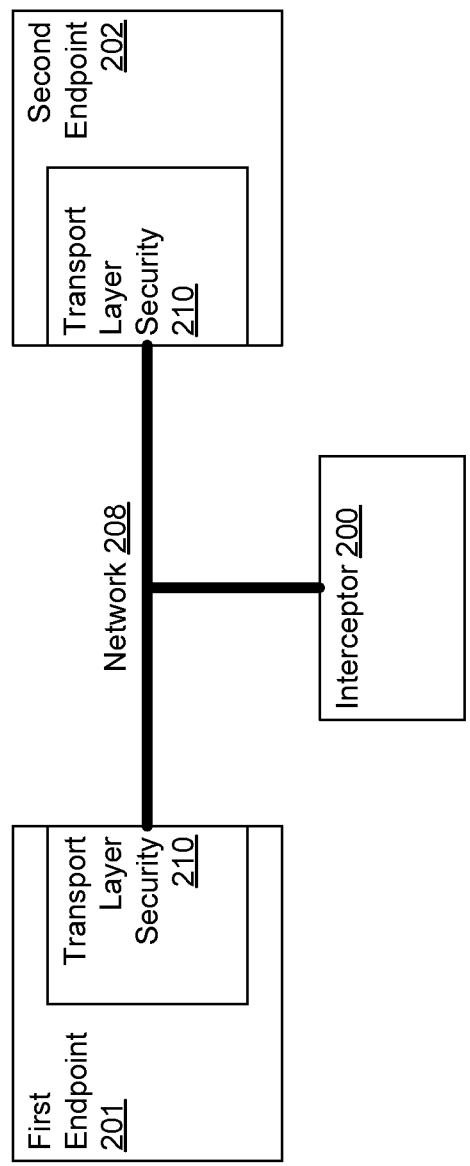
FIG. 2 illustrates a network arrangement in accordance with a preferred embodiment of the present invention.

FIG. 2 illustrates a network arrangement in accordance with a preferred embodiment of the present invention. A network 208 is provided, such as a wired or wireless network or a network having a combination of wired and wireless components. The network is suitable for providing communication facilities between first and second network endpoints 201, 202. Preferably, the network supports the transmission control protocol internet protocol (TCP/IP). The network endpoints 201, 202 are hardware or software components operable to communicate with each other over the network 208. For example, endpoints 201, 202 can be computer systems, machines or devices, or software applications executing on computer systems, machines or devices. Such software applications can include service applications providing defined services, server applications, client applications or any such similar suitable application for communication across the network 208. Such machines or devices can include conventional computer systems, such as illustrated in FIG. 1, or aggregate computer systems comprising multiples such systems. Such machines or devices can also include devices such as cellular or mobile telephones, personal assistants, navigation, entertainment or other similar network connected devices. In a further alternative, the endpoints 201, 202 can be implemented in virtualised operating environments, such as virtual machines executing on one or more partitioned hardware devices. Conceivably, the endpoints 201, 202 can reside on the same physical machine or a suite of machines, interconnected by way of the network 208. Further, conceivably the endpoints 201, 202 can operate in the same software environment, such as the same operating system, interconnected by way of the network 208.

The first and second endpoints 201, 202 apply a transport layer security protocol 210 to their communications, such as the Secure Sockets Layer (SSL) or Transport Layer Security (TLS) protocols. The transport layer security protocol shall be hereafter referred to as TLS, although it will be apparent to those skilled in the art that any suitable alternative transport layer security protocol can be employed. The TLS protocol includes a definition of a handshake process to be undertaken as a series of communications between endpoints when initiating and setting up a new secure communication. In one embodiment, the TLS handshake process includes at least the steps below. It will be appreciated by those skilled in the art that additional or different steps may be employed as part of a TLS handshake, and that additional or different information will be transmitted as part of the handshake process that is beyond the scope of this description.

The first endpoint 201 (known as a TLS client) initiates communications with the second endpoint 202 (known as a TLS server) by sending a "Client Hello" message. The "Client Hello" message includes information including a version number of the TLS protocol applied by the TLS client. The "Client Hello" message also identifies, inter alia, one or more security standards supported by the client. A security standard, such as a cipher suite, specifies various features of a security implementation. For example, a security standard specifies a key exchange algorithm, an encryption algorithm, a message authentication algorithm, and a pseudorandom function. The security standards identified by the TLS client's "Client Hello" message reflect the security standards supported by the TLS client.

The second endpoint 202 (known as a TLS server) receives the "Client Hello". The second endpoint 202 selects one mutually supported security standard (such as a cipher suite) to apply to communication between the endpoints following the handshake process. The selected security standard is communicated by the second endpoint 202 to the first endpoint 201 in a "Server Hello" message.

The second endpoint 202 sends a server certificate to the first endpoint 201 for use by the first endpoint 201 to authenticate the identity of the second endpoint 202. In a preferred embodiment, the server certificate associates a public key for the second endpoint 202 with an identity of the second endpoint 202 and is digitally signed by a certificate authority. As such, the certificate includes at least: a public key for the second endpoint 202; a "distinguished name" identifying the second endpoint 202; an identification of an issuing certificate authority; and a signature of the issuing certificate authority. Most preferably, the certificate will also include an indication of a period of validity of the certificate. Such digital certificates are well known in the art.

Optionally, the second endpoint 202 sends a request to the first endpoint 202 requesting a certificate of the first endpoint 202. Such a request is known as a "Client Certificate Request". If such a request is sent, the first endpoint 201 responds with a client certificate for use by the second endpoint 202 to authenticate the identity of the first endpoint 201.

The first and second endpoints 201, 202 subsequently establish a shared symmetric key as a session key for all substantive communication over the network 208 before the handshake is complete.

A network message interceptor 200 (hereafter the interceptor) is provided in communication with the network 208. The interceptor 200 is a software or hardware component suitable for intercepting messages transmitted across the network 208 between the first and second endpoints 201, 202. The interceptor 200 is external to the first and second endpoints 201, 202 such that it does not form part of either of the endpoints 201, 202. That is to say that the interceptor 200 does not constitute a part of the first endpoint 201 or part of the second endpoint 202 such that, even in the absence of the endpoints 201, 202, the interceptor is operable in communication with the network 208. While the interceptor 200 is external to the endpoints 201, 202, the interceptor can reside in the same physical hardware or logical software environment as one or more of endpoints 201, 202.

The interceptor 200 is operable to intercept handshake messages transmitted between the first and second endpoints 201, 202. In one embodiment, the interceptor 200 is an intercepting proxy, also known as a forced proxy or a transparent proxy. For example, such a proxy can be implemented using Web Cache Control Protocol (WCCP) redirecting network messages using Generic Routing Encapsulation (GRE), a tunneling protocol, or Media Access Control (MAC) address rewrite redirection. Thus, in this embodiment, messages communicated between the first and second endpoints 201, 202 across the network 208 are redirected to the interceptor 200 without requiring special configuration of the endpoints 201, 202.

The interceptor 200 is further operable to prevent communication between the first and second endpoints 201, 202. For example, the interceptor 200 is able to prevent the communication of messages between the endpoints 201, 202 or is able to gracefully terminate communications between the endpoints 201, 202.

The intercepted handshake messages are used by the interceptor 200 to perform security policy and authentication policy enforcement and to provide authorization facilities. Where security policy or authentication policy is not adhered to, or an authorization process fails, the interceptor 200 prevents communication between the first and second endpoints 201, 202, as described below.

Figure 3:
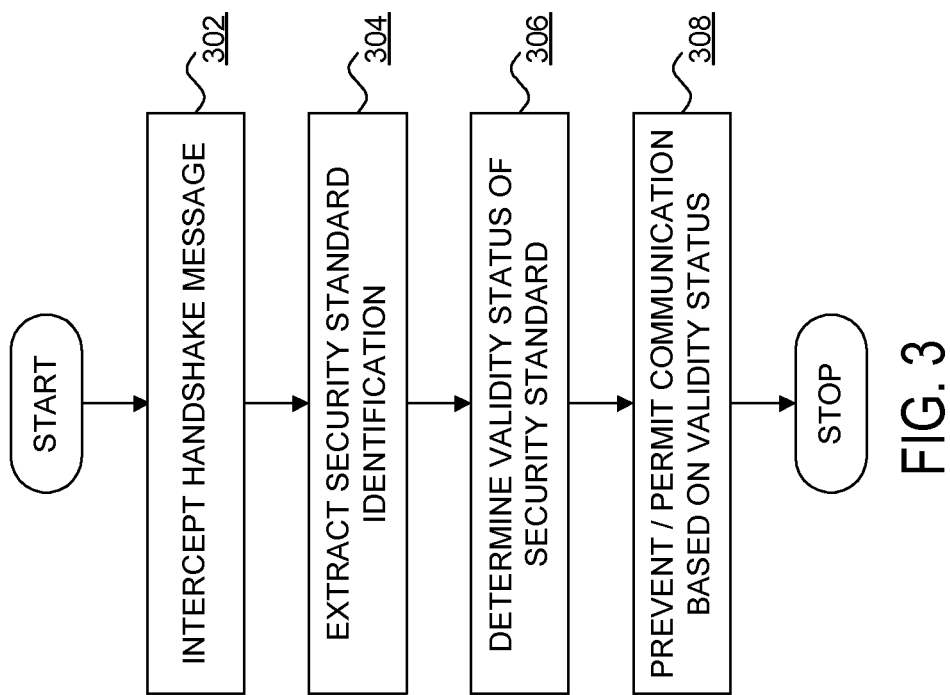
FIG. 3 is a flowchart of a security policy enforcement function of the network message interceptor in accordance with a preferred embodiment of the present invention.

FIG. 3 is a flowchart of a security policy enforcement function of the network message interceptor 200 in accordance with a preferred embodiment of the present invention. At step 302, the interceptor 200 intercepts a handshake message transmitted over the network between the first and second endpoints (i.e., "network endpoints") 201, 202. At step 304 an identification of a security standard selected for the communication between the first and second endpoints 201, 202 is extracted from the intercepted handshake message, such as by extracting a cipher suite from a "Server Hello" message. At step 306 a predefined security policy is referenced to determine a validity status of the identified security standard. For example, a security policy includes a definition of supported cipher suites. At step 308 the interceptor 200 permits or prevents communication between the first and second endpoints 201, 202 based on the determined validity status of the security standard, such that communication is prevented based on a negatively determined validity status of the security standard. Thus, in this way, a predefined security policy can be enforced by the interceptor 200 such that any deviation from the security policy by the first or second endpoints 201, 202 results in the prevention of communication between the endpoints 201, 202.

Figure 4:
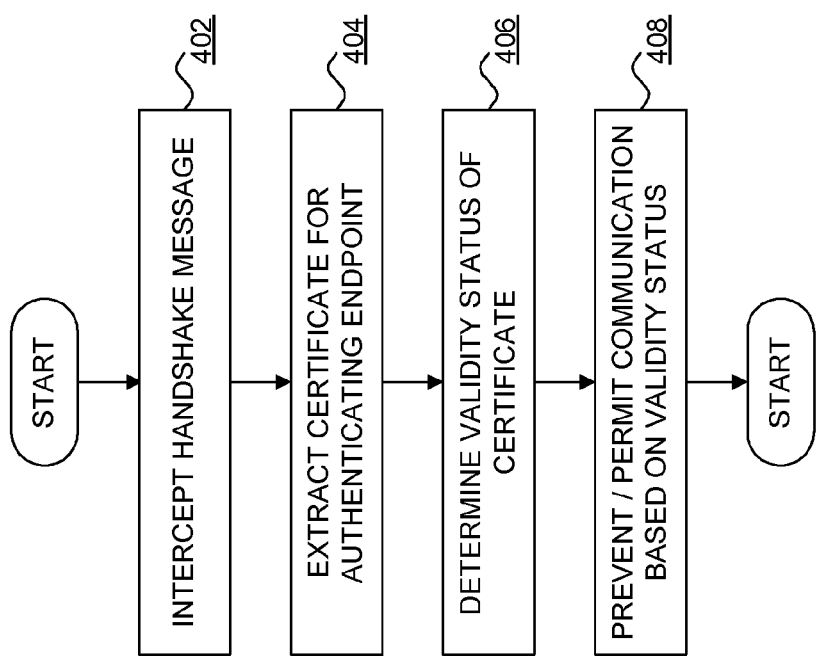
FIG. 4 is a flowchart of an authentication policy enforcement function of the network message interceptor in accordance with a preferred embodiment of the present invention.

FIG. 4 is a flowchart of an optional authentication policy enforcement function of the network message interceptor 200 in accordance with a preferred embodiment of the present invention. At step 402, the interceptor 200 intercepts a handshake message transmitted over the network between the first and second endpoints 201, 202. At step 404 an identification of a certificate for an authenticating one of the first and second endpoints 201, 202 is extracted from the intercepted handshake message. At step 406 a validity status of the extracted certificate is determined. The validity of the certificate includes one or more of: verifying that the certificate is current; verifying that the certificate is not revoked; verifying that the certifying authority for the certificate is trusted; verifying that a signature of the certifying authority in the certificate is valid; and verifying that a distinguishing name for the endpoint identified by the certificate is consistent with a distinguishing name for the endpoint provided by a trusted certificate authority. At step 408 the interceptor 200 permits or prevents communication between the first and second endpoints 201, 202 based on the determined validity status of the certificate, such that communication is prevented based on a negatively determined validity status of the certificate. Thus, in this way, authentication policy can be enforced by the interceptor 200 such that any failure of the first or second endpoints 201, 202 to properly authenticate results in the prevention of communication between the endpoints 201, 202.

Figure 5:
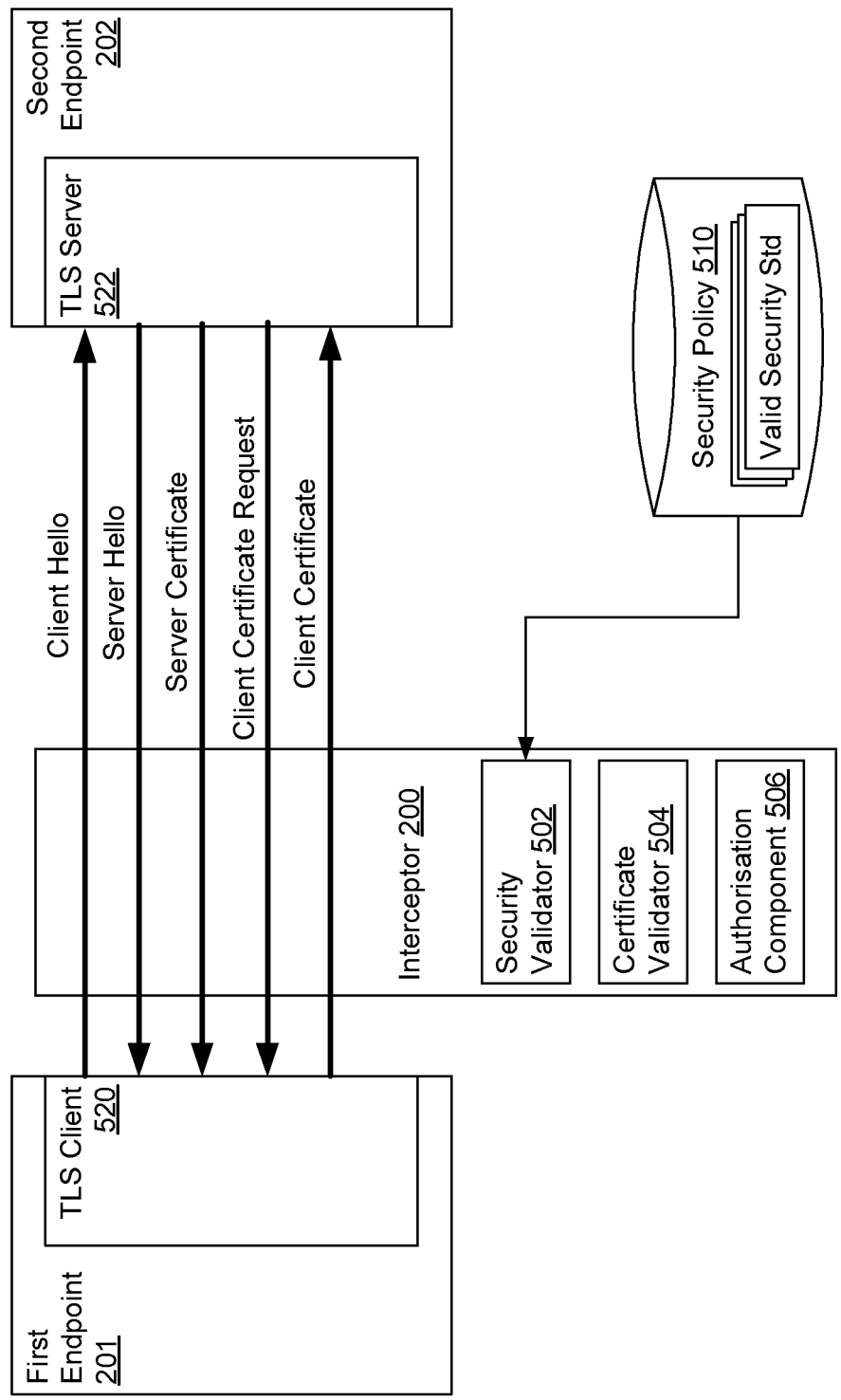
FIG. 5 illustrates the network message interceptor for intercepting messages between the first and second endpoints in accordance with a preferred embodiment of the present invention.

FIG. 5 illustrates the network message interceptor 200 for intercepting messages between the first 201 and second 202 endpoints in accordance with a preferred embodiment of the present invention. Many of the features of FIG. 5 are described above with respect to FIG. 2 and a description of these features will not be repeated here. Each of the first and second endpoints 201, 202 includes TLS protocol functionality as TLS client 520 at the first endpoint 201 and TLS server 522 at the second endpoint 202.

The interceptor 200 includes a security validator 502 for performing the security policy enforcement function of the interceptor 200. The security validator is a software or hardware component operable in communication with a security policy 510 to determine a validity status of an identified security standard extracted from a "Server Hello" message sent by the second endpoint 202. The security validator 502 and security policy 510 are described in more detail below with respect to FIG. 6.

The interceptor 200 further includes an optional certificate validator 504 for performing the authentication policy enforcement function of the interceptor 200. The certificate validator 504 is a software or hardware component operable to determine a validity status of a certificate extracted from a "Server Certificate" message or a "Client Certificate" message sent by the endpoints 201, 202. The certificate validator 504 is described in more detail below with respect to FIG. 8.

The interceptor 200 further includes an optional authorization component 506 for authorizing a communication between the first and second endpoints 201, 202. The authorization component 506 is a software or hardware component operable to determine whether a communication between the first and second endpoints 201, 202 is authorized based on a predefined authorization scheme. The authorization component 506 is described in more detail below with respect to FIG. 10.

The security validator 502, certificate validator 504 and authorization component 504 are illustrated as integral parts of the interceptor 200. It will be apparent to those skilled in the art that one or more of these components may be provided external to the interceptor 200, such as in software or hardware components linked, connected or accessible to the interceptor 200.

Figure 6:
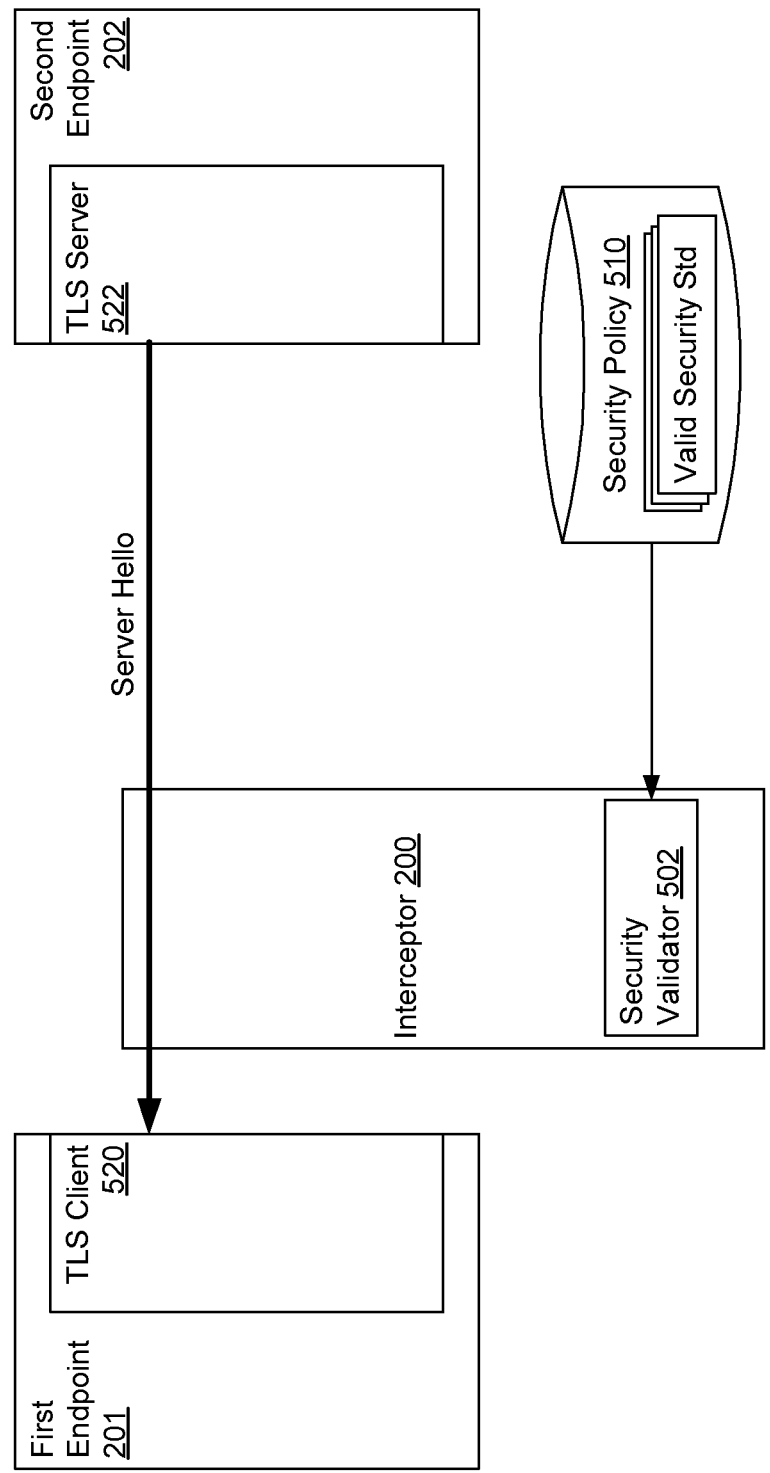
FIG. 6 illustrates the network message interceptor in use for enforcing a security policy in accordance with a preferred embodiment of the present invention.

FIG. 6 illustrates the network message interceptor 200 in use for enforcing a security policy 510 in accordance with a preferred embodiment of the present invention. Many of the features of FIG. 6 are described above with respect to FIG. 2 and FIG. 5 and a description of these features will not be repeated here. The interceptor 200 intercepts the "Server Hello" message sent by the second endpoint 202. The "Server Hello" message includes an identification of a security standard selected by the second endpoint 202 for use in substantive communication between the first and second endpoints. The identified security standard is one of a set of security standards listed by the first endpoint 201 in a preceding "Client Hello" message.

In a preferred embodiment, the identified security standard is expressed as a cipher suite, such as one of the cipher suites defined in RFC 5246 available from the Internet Engineering Taskforce (IETF). TLS cipher suites are expressed as:

TL_KX_ITH_CIPHER_MAC where: Kx indicates a key exchange mechanism; CIPHER indicates an encryption algorithm; and MAC indicates a hashing or message digest algorithm. Examples of key exchanges include: RSA (Rivest, Shamir, Adleman); DH (Diffie-Hellman); KRB5 (Kerberos); and DSA (Digital Signature Algorithm). Examples of encryption and hashing algorithms include: 3DES (Tripple Data Encryption Algorithm); AES (Advanced Encryption Standard); IDEA (International Data Encryption Algorithm); RC2 (Rivest Cipher 2); RC4 (Rivest Cipher 4); SHA (Secure Hash Algorithm); and MD5 (Message Digest algorithm 5).

The interceptor 200 determines a validity status of the extracted security standard using the security validator 502 with reference to the security policy 510. The security policy 510 defines characteristics of acceptable security standards for communication over the network 208. For example, the security policy 510 includes one or more of: a list of acceptable key exchange mechanisms; a list of acceptable encryption functions; a list of acceptable hashing algorithms; or a minimum key length for encryption. The security policy 510 is illustrated as external to the interceptor 200 and the security validator 502 although it will be appreciated by those skilled in the art that the security policy 510 could equally be implemented as part of either of those components, or elsewhere accessible by the security validator 502.

Figure 7:
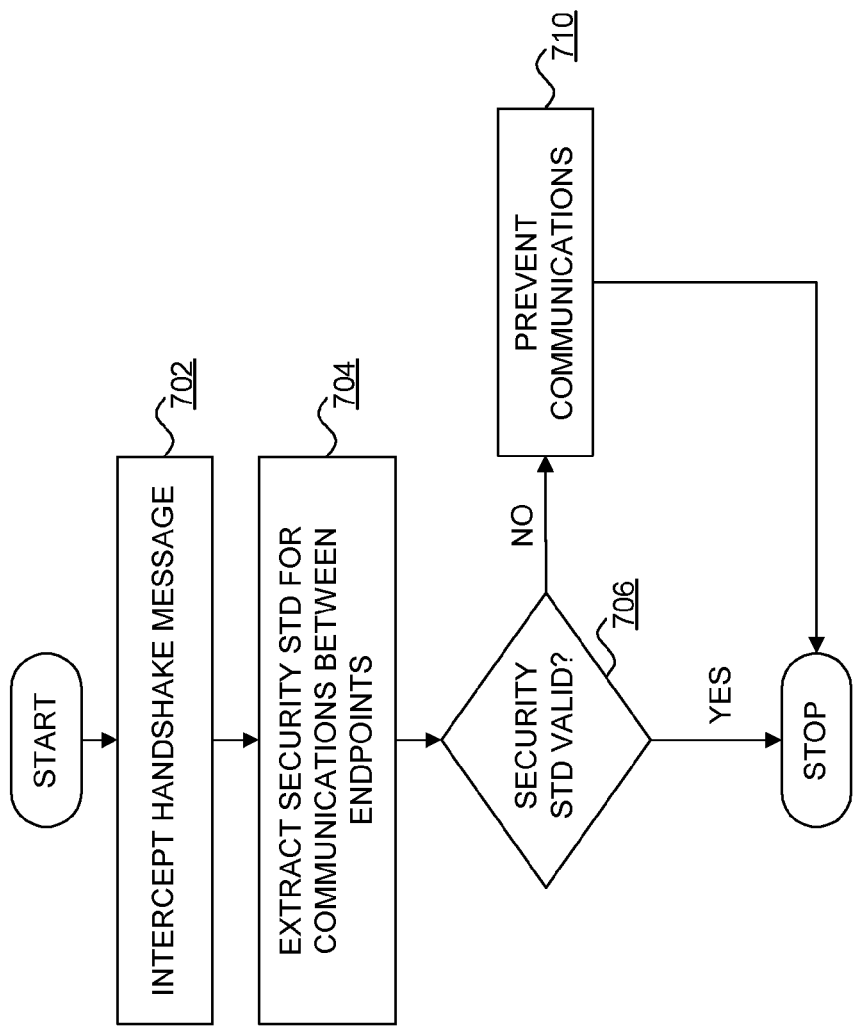
FIG. 7 is a flowchart of a method of operating the network message interceptor for enforcing a security policy in accordance with a preferred embodiment of the present invention.

FIG. 7 is a flowchart of a method of operating the network message interceptor 200 for enforcing a security policy in accordance with a preferred embodiment of the present invention. At step 702, the interceptor 200 intercepts the "Server Hello" handshake message sent by the second endpoint 202. At step 704 the security standard, such as a cipher suite, is extracted from the handshake message. At step 706 the security validator 502 validates whether the security standard satisfies the security policy 510. Where the extracted security standard does not conform to the security policy 510, the interceptor 200 is operable to prevent communications between the first and second endpoints 201, 202.

In this way, a network service provider employing an interceptor 200 in accordance with the preferred embodiments is able to enforce a security policy by examining the security standard selected by endpoints and preventing communication between endpoints where the selected security standard does not conform to the security policy. It will be further appreciated by those skilled in the art that other aspects of security standard can be checked and validated against the security policy 510 such as, for example, a policy to prevent the resumption of previous communications sessions between endpoints, which can also be detected by inspection of the "Client Hello" and "Server Hello" handshake messages. Accordingly, endpoints 201, 202 are unable to provide substandard, ineffective or insufficient security in respect of communications over network 208, and the network service provider can assure conformance with security policy.

Figure 8:
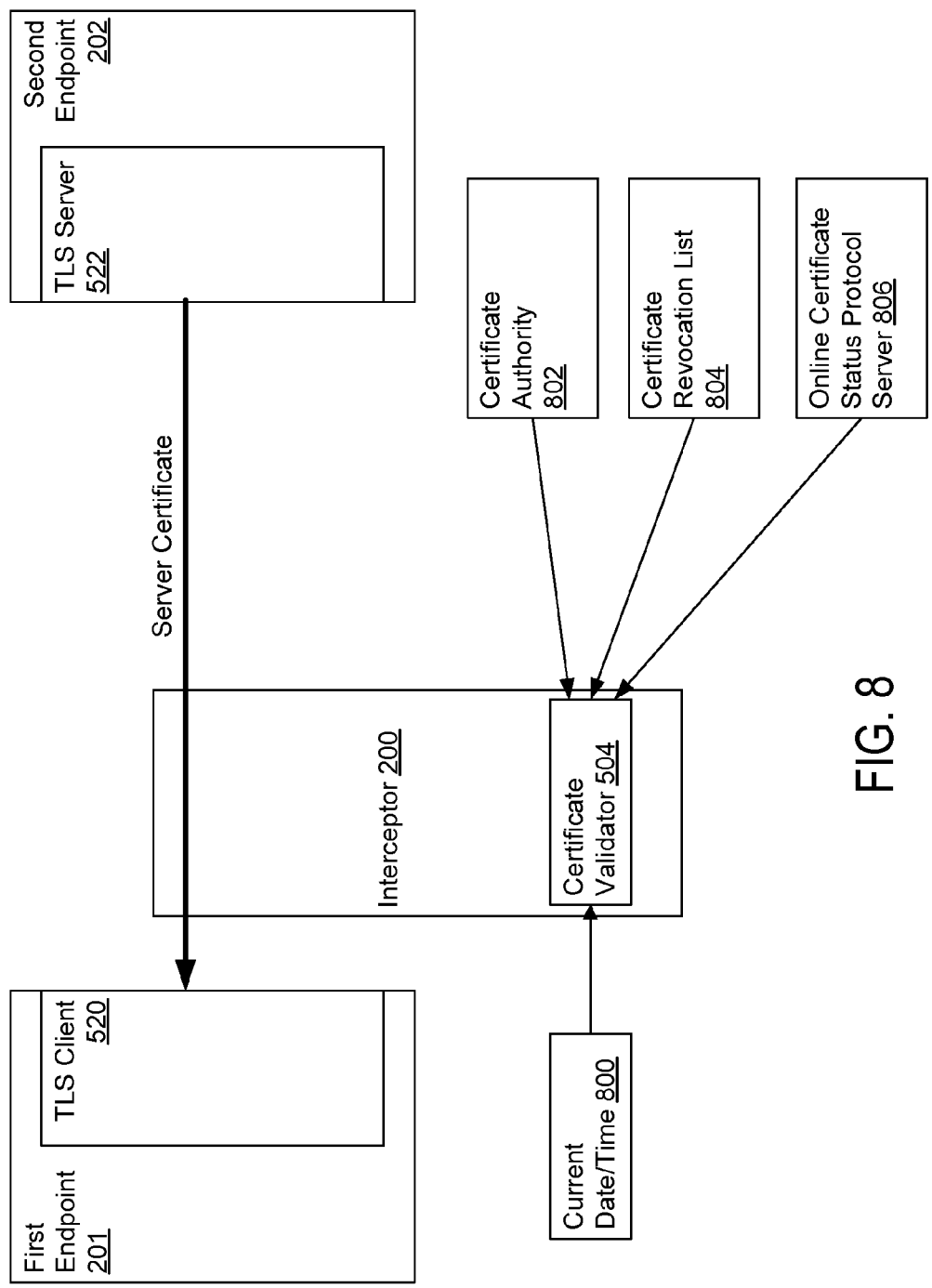
FIG. 8 illustrates the network message interceptor in use for enforcing an authentication policy in accordance with a preferred embodiment of the present invention.

FIG. 8 illustrates the network message interceptor 200 in use for optionally enforcing an authentication policy in accordance with a preferred embodiment of the present invention. Many of the features of FIG. 8 are described above with respect to FIG. 2 and FIG. 5 and a description of these features will not be repeated here. The interceptor 200 intercepts the "Server Certificate" handshake message sent by the second endpoint 202 to validate the status of a certificate sent by the second endpoint 202. It will be appreciated by those skilled in the art that the interceptor 200 could equally intercept the "Client Certificate" handshake message that may optionally be sent subsequently in order to validate the status of a certificate sent by the first endpoint 201.

The interceptor 200 extracts a certificate from the handshake message. The certificate validator 504 determines a validity status of the certificate to confirm an identity of the second endpoint 202. The certificate validator 504 undertakes this determination with reference to one or more of: a current date and/or time 800; a certificate authority 802; a Certificate Revocation List (CRL) 804; and an Online Certificate Status Protocol (OCSP) server 806. The current date and/or time 800 are used to determine if the certificate is current or if the certificate has expired. The CRL 804 and OCSP server 806 can be used to determine if the certificate has been revoked. The certificate authority 802 can be used to determine if a certifying authority signature in the certificate is valid, and to determine if a distinguished name indicated in the certificate is valid.

Figure 9:
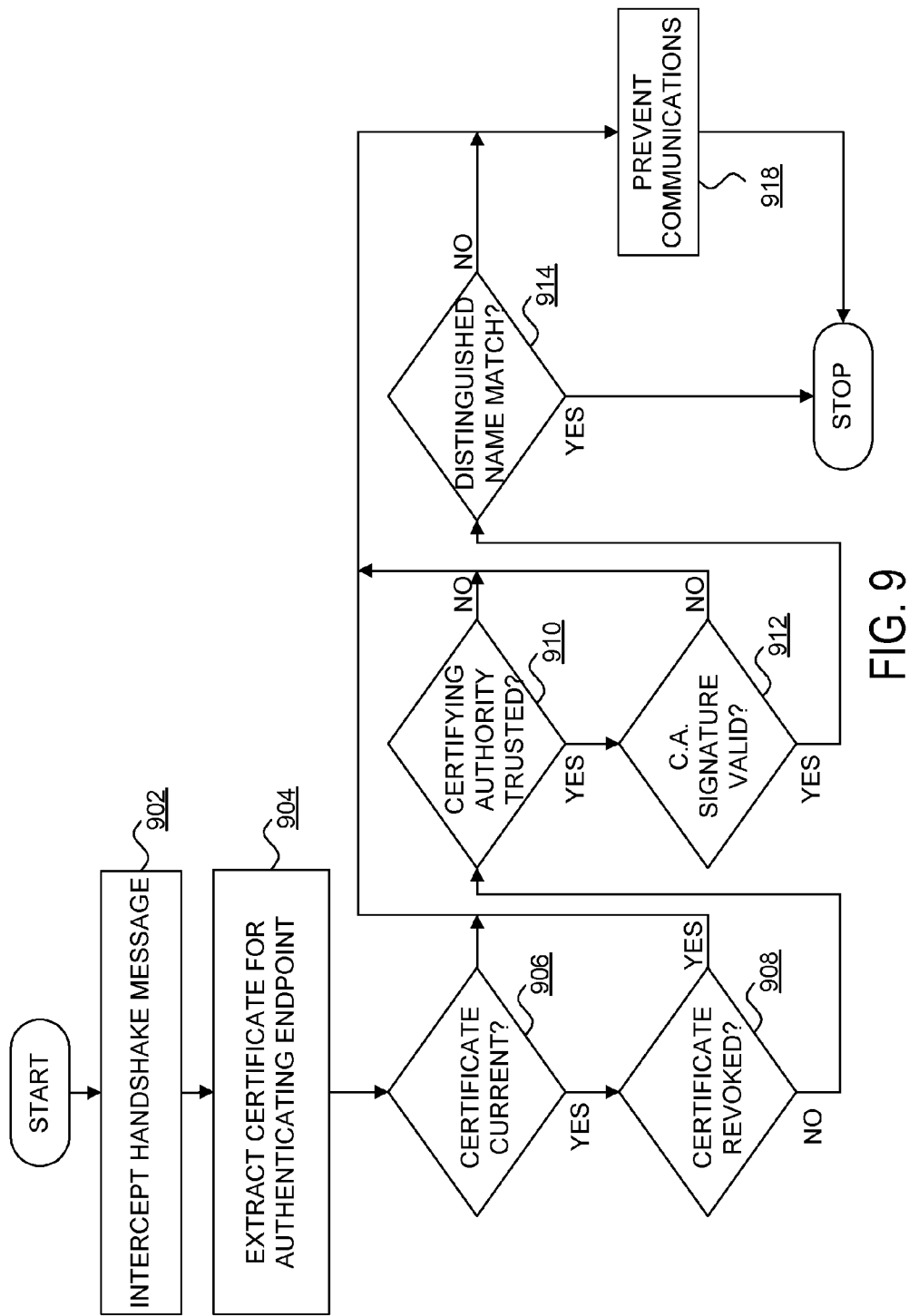
FIG. 9 is a flowchart of a method of operating the network message interceptor for enforcing an authentication policy in accordance with a preferred embodiment of the present invention.

FIG. 9 is a flowchart of a method of operating the network message interceptor 200 for optionally enforcing an authentication policy in accordance with a preferred embodiment of the present invention. At step 902 the interceptor 200 intercepts the "Server Certificate" (or "Client Certificate") handshake message. At step 904 the interceptor 200 extracts a certificate from the handshake message. At step 906 the certificate validator 504 checks if the certificate is current with reference to the current date and/or time 800. At step 908 the certificate validator 504 checks if the certificate is revoked with reference to CRL 804, OCSP server 806 or certificate authority 802. At step 910 the certificate validator 504 checks if the certificate authority 802 for the certificate is trusted. The interceptor 200 or certificate validator 504 keeps a list or reference to a list of trusted certificate authorities for this purpose. At step 912 the certificate validator 504 checks if the signature of the certifying authority in the certificate is valid. Validation of the signature can be achieved by decrypting the signature as a message digest using a public key associated with the certificate authority 802, and verifying the message digest. At step 914 the certificate validator 504 checks if a distinguished name in the certificate matches a distinguished name held by the certificate authority 802. Negative determinations at steps 906, 910, 912, 914 and a positive determination at step 908 results in the interceptor preventing communications between the first and second endpoints 201, 202.

Where a client certificate is requested by the second endpoint 202 with a "Client Certificate Request" message, the first endpoint 201 will send the client certificate as a "Client Certificate" message (FIG. 5). To prove that the first endpoint 201 is in possession of a private key associated with a public key in the client certificate, the first endpoint 201 further sends a "Certificate Verify" message to the second endpoint 202. The "Certificate Verify" message consists of a concatenation of all messages in the handshake between the first and second endpoints 201, 202 so far (from the "Client Hello" message up to, but not including, the "Certificate Verify" message). The "Certificate Verify" message is signed with a private key held by the first endpoint 201. Since the second endpoint 202 has access to a public key for the first endpoint 201 from the client certificate sent by the first endpoint 201, the second endpoint 202 can verify the signed "Certificate Verify" message and thus know for certain that the first endpoint 201 is in possession of a private key corresponding to the public key in the client certificate. The interceptor 200 also has access to the client certificate and the handshake messages, and so it can also perform this process to fully authenticate the first endpoint 201. Thus, in addition to the method of FIG. 9, where the interceptor 200 intercepts a "Client Certificate" message, the interceptor 200 is further operable to intercept a "Certificate Verify" message and to further authenticate the first endpoint 201 by confirming that the first endpoint is in possession of a private key corresponding to the public key in the client certificate. This will require that the interceptor 200 stores a copy of all handshake messages up to the "Certificate Verify" message and retains a copy of the client certificate.

In this way, a network service provider employing an interceptor 200 in accordance with the preferred embodiments is able to enforce an authentication policy by examining a certificate transmitted between endpoints and preventing communication between endpoints where the certificate is not valid. Accordingly, endpoints 201, 202 are unable to provide substandard, ineffective or insufficient authentication functions in respect of communications over network 208, and the network service provider can assure conformance with authentication policy.

Figure 10:
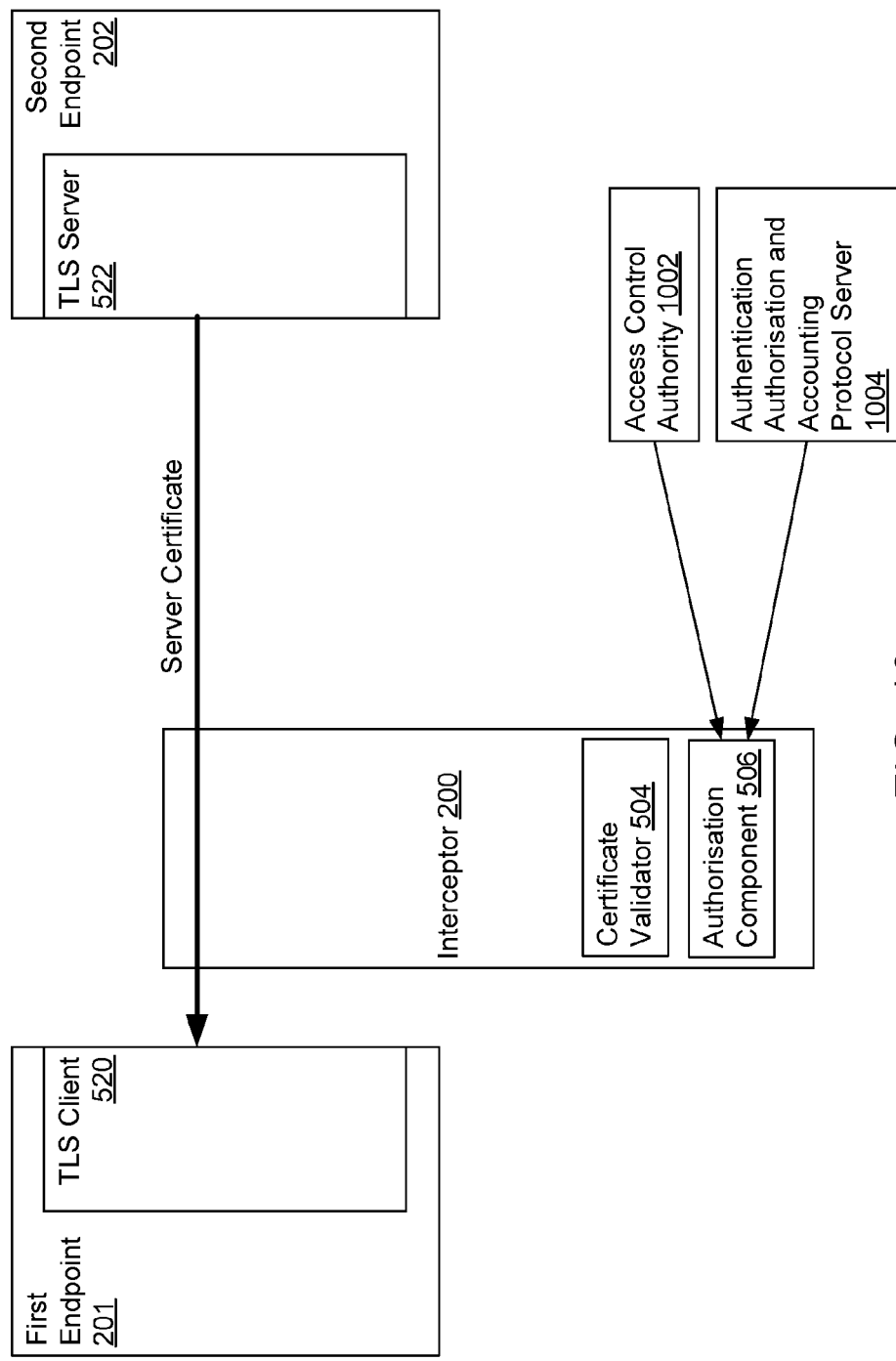
FIG. 10 illustrates the network message interceptor in use for undertaking an authorization function in accordance with a preferred embodiment of the present invention.

FIG. 10 illustrates the network message interceptor 200 in use for optionally undertaking an authorization function in accordance with a preferred embodiment of the present invention. Many of the features of FIG. 10 are described above with respect to FIG. 2 and FIG. 5 and a description of these features will not be repeated here. The arrangement of FIG. 10 builds upon the arrangement of FIG. 8 and FIG. 9 by addition of authorization component 506. The authorization component 506 is operable to determine whether a communication between the first and second endpoints 201, 202 is authorized. The authorization component 506 undertakes this determination with reference to authorization information such as: access control authority information 1002; access control lists (not illustrated); or an authentication, authorization and accounting (AAA) protocol server 1004. The authorization component 506 uses identification information for the first and second endpoints 201, 202, such as authenticated identification information, network addresses, endpoint identifiers or similar, to conduct the authorization process. Where the authorization component 506 determines that communication between the first and second endpoints 201, 202 is not authorized, the interceptor 200 is operable to prevent communication between the first and second endpoints 201, 202.

In this way, a network service provider employing an interceptor 200 in accordance with the preferred embodiments is able to enforce an authorization scheme by examining certificates transmitted between endpoints and preventing communication between endpoints where communication between the endpoints is not authorized. Accordingly, endpoints 201, 202 are unable to provide substandard, ineffective or insufficient authorization mechanisms in respect of communications over network 208. Further, endpoints 201, 202 are able to operate without concern for authorization which can be addressed centrally by the interceptor 200, without duplication of authorization functionality across multiple endpoints.

If the second endpoint 202 is able to authenticate the client certificate, the server will authenticate the client and respond with a "Certificate Verify" message, which is transmitted from the second endpoint 202 to the first endpoint 201. A crucial part of the client authentication is inspection of the CertificateVerify message (Section 7.4.8 of the TLS 1.2 RFC). This is only sent from the client to the server and only when the client presents a certificate as part of the TLS handshake. This message is made up of a concatenation of all messages in the handshake so far, from the ClientHello up to but not including the CertificateVerify message, and is signed with the client's private key.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of operating a network message interceptor for enforcing a security policy for communication over a network between first and second network endpoints, the interceptor being in communication with the network and external to the first and second network endpoints, the network including transport layer security, and the security policy identifying at least one valid security standards for communication over the network, the method comprising:

intercepting, by one or more processors, a handshake message transmitted over the network between the first and second network endpoints;

extracting, by one or more processors, from the handshake message an identification of a security standard selected for the communication between the first and second network endpoints;

determining, by one or more processors, a validity status of the identified security standard based on the security policy, wherein the security policy defines characteristics of predetermined acceptable security standards for communication over the network;

preventing, by one or more processors, communication between the first and second network endpoints based on a negatively determined validity status of the identified security standard;

extracting, by one or more processors, an identification of a security standard selected for communication between the first and second network endpoints from the handshake message, wherein the identification of the security standard is determined by extracting a cipher suite from an initial "Server Hello" message from the first network endpoint to the second network endpoint, and wherein the cipher suite is used by the security standard to encrypt communications between the first and second network endpoints;

referencing, by one or more processors, a predefined security policy to determine a validity status of the identified security standard from the handshake message, wherein the predefined security policy includes a definition of supported cipher suites used in the communication between the first and second network endpoints, and wherein the predefined security policy further prevents a resumption of previous communication sessions between the first and second network endpoints;

verifying, by one or more processors, that the first network endpoint is in possession of a private key associated with a public key in the certificate by intercepting a "Certificate Verify" message from the first network endpoint to the second network endpoint, wherein the "Certificate Verify" message consists of a concatenation of all messages in a handshake between the first and second network endpoints, wherein said all messages in the handshake between the first network endpoint and the second network endpoint include a "Client Hello" message from the first network endpoint to the second network endpoint, a "Server Hello" message from the second network endpoint to the first network endpoint, a "Server Certificate" message from the second network endpoint to the first network endpoint, a "Client Certificate Request" message from the second network endpoint to the first network endpoint, and a "Client Certificate" message from the first network endpoint to the second network endpoint; and further preventing, by one or more processors, communication between the first and second network endpoints based on the first and second endpoints complying with the security standard selected for communication between the first and second network endpoints, the first and second endpoints complying with the predefined security policy, and verification that the first network endpoint is in possession of the private key associated with the public key in the certificate based on the "Certificate Verify" message from the first network endpoint to the second network endpoint.

2. The method of claim 1, further comprising:
permitting, by one or more processors, communication between the first and second network endpoints based on a positively determined validity status of the identified security standard.

3. The method of claim 1, further comprising:
preventing, by one or more processors, communication between the first and second network endpoints based on a determination by an authorization component using an identification of each of the first and second network endpoints.

4. The method of claim 1, wherein the security standard is a cipher suite.

5. The method of claim 1, wherein the security policy identifies at least one of:
at least one key exchange method;
at least one encryption algorithm;
at least one message digest algorithm; and
at least one minimum key length.

6. The method of claim 5, wherein the security standard identifies at least one of:
a key exchange method;
an encryption algorithm;
and a message digest algorithm.

7. The method of claim 2, wherein the security policy indicates whether resumption of a communication session is allowable.

8. The method of claim 2, wherein the interceptor is a transparent proxy.

9. A network message interceptor for enforcing a security policy for communication over a network between first and second network endpoints, the network message interceptor being in communication with the network and external to the first and second network endpoints, the network including transport layer security, and the security policy identifying at least one valid security standards for communication over the network, wherein the network message interceptor comprises one or more processors, and a non-transitory computer readable storage device storing instructions, the one or more processors executing the instructions to:

intercept a handshake message transmitted over the network between the first and second network endpoints;

extract from the handshake message an identification of a security standard selected for the communication between the first and second network endpoints;

determine a validity status of the identified security standard based on the security policy, wherein the security policy defines characteristics of predetermined acceptable security standards for communication over the network;

prevent communication between the first and second network endpoints based on a negatively determined validity status of the identified security standard;

extract an identification of a security standard selected for communication between the first and second network endpoints from the handshake message, wherein the identification of the security standard is determined by extracting a cipher suite from an initial "Server Hello" message from the first network endpoint to the second network endpoint, and wherein the cipher suite is used by the security standard to encrypt communications between the first and second network endpoints;

reference a predefined security policy to determine a validity status of the identified security standard from the handshake message, wherein the predefined security policy includes a definition of supported cipher suites used in the communication between the first and second network endpoints, and wherein the predefined security policy further prevents a resumption of previous communication sessions between the first and second network endpoints;

verify that the first network endpoint is in possession of a private key associated with a public key in the certificate by intercepting a "Certificate Verify" message from the first network endpoint to the second network endpoint, wherein the "Certificate Verify" message consists of a concatenation of all messages in a handshake between the first and second network endpoints, wherein said all messages in the handshake between the first network endpoint and the second network endpoint include a "Client Hello" message from the first network endpoint to the second network endpoint, a "Server Hello" message from the second network endpoint to the first network endpoint, a "Server Certificate" message from the second network endpoint to the first network endpoint, a "Client Certificate Request" message from the second network endpoint to the first network endpoint, and a "Client Certificate" message from the first network endpoint to the second network endpoint; and further prevent communication between the first and second network endpoints based on the first and second endpoints complying with the security standard selected for communication between the first and second network endpoints, the first and second endpoints complying with the predefined security policy, and verification that the first network endpoint is in possession of the private key associated with the public key in the certificate based on the "Certificate Verify" message from the first network endpoint to the second network endpoint.

10. The network message interceptor of claim 9, wherein the one or more processors further execute instructions to:
permit communication between the first and second network endpoints based on a positively determined validity status of the identified security standard.

11. The network message interceptor of claim 10, wherein the one or more processors further execute instructions to:
prevent communication between the first and second network endpoints based on a determination of an authorization component using an identification of each of the first and second network endpoints.

12. The network message interceptor of claim 9, wherein the security standard is a cipher suite.

13. The network message interceptor of claim 9, wherein the security policy identifies at least one of: at least one key exchange method;
at least one encryption algorithm;
at least one message digest algorithm; and
at least one minimum key length.

14. The network message interceptor of claim 9, wherein the security standard identifies at least one of:
a key exchange method;
an encryption algorithm; and
a message digest algorithm.

15. The network message interceptor of claim 9, wherein the security policy indicates whether resumption of a communication session is allowable.

16. A computer program product for operating a network message interceptor for enforcing a security policy for communication over a network between first and second network endpoints, the interceptor being in communication with the network and external to the first and second network endpoints, the network including transport layer security, and the security policy identifying at least one valid security standards for communication over the network, the computer program product comprising a non-transitory computer readable storage medium having program code embodied therewith, the program code readable and executable by a processor to perform a method comprising:
intercepting a handshake message transmitted over the network between the first and second network endpoints;
extracting from the handshake message an identification of a security standard selected for the communication between the first and second network endpoints;
determining a validity status of the identified security standard based on the security policy;
preventing communication between the first and second network endpoints based on a negatively determined validity status of the identified security standard;
extracting an identification of a security standard selected for communication between the first and second network endpoints from the handshake message, wherein the identification of the security standard is determined by extracting a cipher suite from an initial "Server Hello" message from the first network endpoint to the second network endpoint, and wherein the cipher suite is used by the security standard to encrypt communications between the first and second network endpoints;
referencing a predefined security policy to determine a validity status of the identified security standard from the handshake message, wherein the predefined security policy includes a definition of supported cipher suites used in the communication between the first and second network endpoints, and wherein the predefined security policy further prevents a resumption of previous communication sessions between the first and second network endpoints;
verifying that the first network endpoint is in possession of a private key associated with a public key in the certificate by intercepting a "Certificate Verify" message from the first network endpoint to the second network endpoint, wherein the "Certificate Verify" message consists of a concatenation of all messages in a handshake between the first and second network endpoints, wherein said all messages in the handshake between the first network endpoint and the second network endpoint include a "Client Hello" message from the first network endpoint to the second network endpoint, a "Server Hello" message from the second network endpoint to the first network endpoint, a "Server Certificate" message from the second network endpoint to the first network endpoint, a "Client Certificate Request" message from the second network endpoint to the first network endpoint, and a "Client Certificate" message from the first network endpoint to the second network endpoint; and
further preventing communication between the first and second network endpoints based on the first and second endpoints complying with the security standard selected for communication between the first and second network endpoints, the first and second endpoints complying with the predefined security policy, and verification that the first network endpoint is in possession of the private key associated with the public key in the certificate based on the "Certificate Verify" message from the first network endpoint to the second network endpoint.

17. The computer program product of claim 16, wherein the method further comprises:
permitting communication between the first and second network endpoints based on a positively determined validity status of the identified security standard.

18. The method of claim 1, wherein the security policy identifies a list of acceptable key exchange mechanisms, a list of acceptable encryption functions a list of acceptable hashing algorithms, and a minimum key length for encryption used for communication over the network.

* * * * *